United States Patent [19]

Phaal et al.

[11] 4,373,593
[45] * Feb. 15, 1983

[54] DRILL BIT

[75] Inventors: Cornelius Phaal, Rivonia, South Africa; Rainer Jürgens, Celle, Fed. Rep. of Germany

[73] Assignee: Christensen, Inc., Salt Lake City, Utah

[*] Notice: The portion of the term of this patent subsequent to Feb. 24, 1998, has been disclaimed.

[21] Appl. No.: 128,998

[22] Filed: Mar. 10, 1980

[30] Foreign Application Priority Data

Mar. 16, 1979 [DE] Fed. Rep. of Germany ....... 2910347

[51] Int. Cl.³ .............................................. E21B 10/46
[52] U.S. Cl. ................................... 175/329; 175/410
[58] Field of Search ................ 175/329, 330, 410; 467/119, 118; 76/101 R, DIG. 12, 101 E, DIG. 11; 408/145; 125/39

[56] References Cited

U.S. PATENT DOCUMENTS

| 1,952,002 | 3/1934 | Trembow | 407/119 |
| 2,275,021 | 3/1942 | Somes | 76/101 A |
| 3,106,973 | 10/1963 | Christensen | 175/330 |
| 3,702,573 | 11/1972 | Nemeth | 407/119 |
| 3,745,623 | 7/1973 | Wentorf | 407/119 |
| 4,200,159 | 4/1980 | Peschel | 175/329 |

FOREIGN PATENT DOCUMENTS

| 529529 | 11/1940 | United Kingdom | 76/DIG. 101 |
| 980799 | 1/1965 | United Kingdom | 175/329 |

Primary Examiner—William F. Pate, III
Attorney, Agent, or Firm—Rufus M. Franklin

[57] ABSTRACT

A rotary boring bit for boreholes comprises a body provided on its outer periphery with cutting members (6) consisting of a cutting portion (8) and a supporting portion (7), each cutting member being formed as a segment of a sintered body (1) having a core (3) of cutting material encased by a shell (2).

12 Claims, 36 Drawing Figures

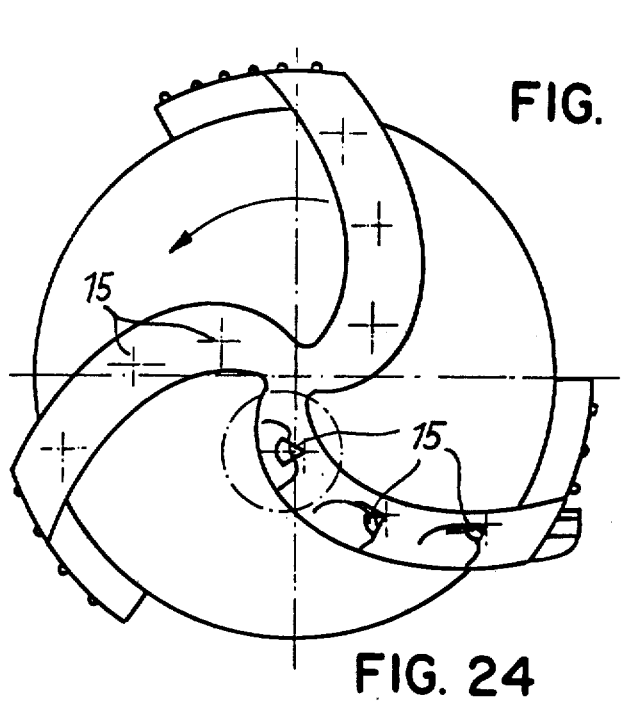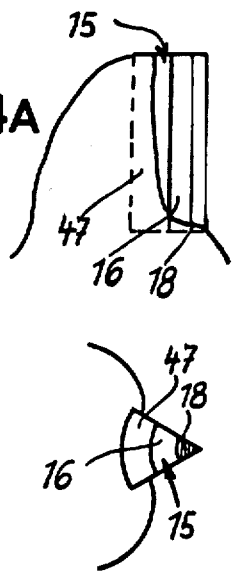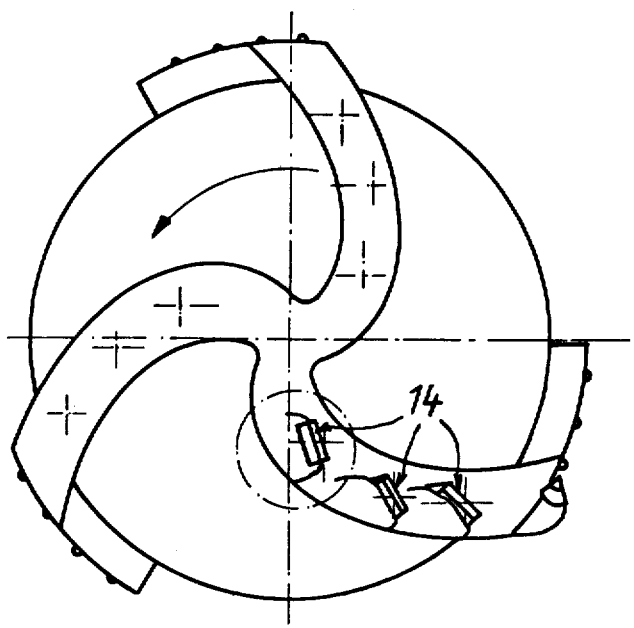
FIG. 24  FIG. 24A  FIG. 24B  FIG. 25

DRILL BIT

The invention relates to a rotary boring bit for boreholes, the bit having a body on the periphery of which are provided cutting members.

In these rotary boring bits of the prior art, the cutting members are constructed in the form of small plates which are circular in plan view. The supporting portion of hard metal or the like hard substance such as tungsten carbide, silicon carbide or aluminum oxide in particular, forms with the cutting portion of polycrystalline or multicrystalline sintered diamond, a sintered shaped body, the diamond layer having a thickness of only about 0.5 mm. The cutting members are secured to the deep boring bit, at its surface, in such a manner that the circular diamond layer forms the cutting face of the cutting member, in order to reduce the wear by cratering which is to be expected.

In the practical use of deep boring bits equipped with such cutting members, it has been found that these cannot be used in the optimum manner with the changing boring conditions and are generally exposed to rapid wear not only at the cutting face but also at the cutting edge and the flank. This is accompanied by a rapid weakening of the cutting portion which leads to chipping of the cutting edge.

It is an object of the present invention to obviate or mitigate these difficulties by using cutting members of special construction. With this construction, in contrast to the known cutting members in the form of small plates with a diamond covering, the cutting portion is formed not by a thin surface layer but by a mass of the cutting member increased by a corner region. As a result, during the cutting work of the cutting member, an optimum removal of heat results from the cutting portion to the supporting portion or to the tool, which is caused by the enlarged diamond mass utilizing the good heat conductivity of diamond. Apart from the wear due to cratering, also the wear of the cutting edge and the wear of the flank is largely prevented by the cutting portion constructed in the form of a solid diamond cutting wedge according to the invention.

In addition, a large number of new possibilities of arranging the cutting member in relation to the ground or rock formation to be processed are possible in such a manner that this is cut or even only scratched or scraped by the cutting member with various setting angles. This means that the cutting member for deep boring bits is suitable for a wide range of application which extends from soft, plastic formations to brittle, hard formations. At the same time, the cutting portion is securely held and supported by the supporting portion, which has a favourable influence on the durability of the cutting portion according to the invention. Also, the cutting members are economical to produce. It may be mentioned that cubic boron nitride or the like superhardned materials may be provided instead of diamond for the cutting portion.

The present invention is a rotary boring bit for boreholes, comprising a body which is provided on its outer periphery with cutting members each of which consist of a supporting portion and a cutting portion disposed on the supporting portion, each cutting member being formed as a segment of a sintered body surrounding the cutting portion with its supporting portion as a casing at least at the periphery.

Embodiments of the present invention will now be described, by way of example, with the reference to the accompanying drawings, in which.

Figure 18:
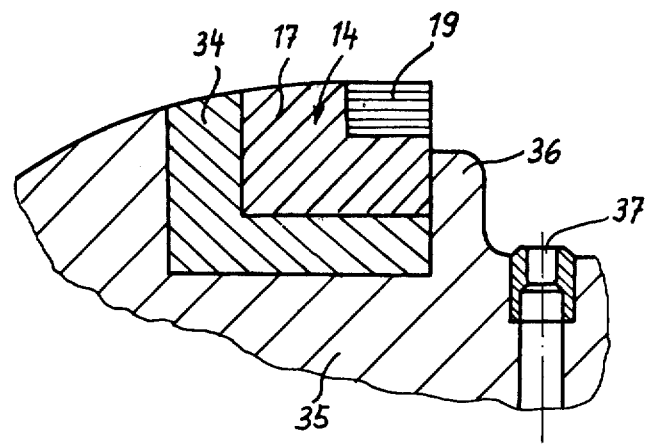
FIG. 18 shows a detail section through a deep boring bit to illustrate the securing of a cutting member to the bit.
Figure 19:
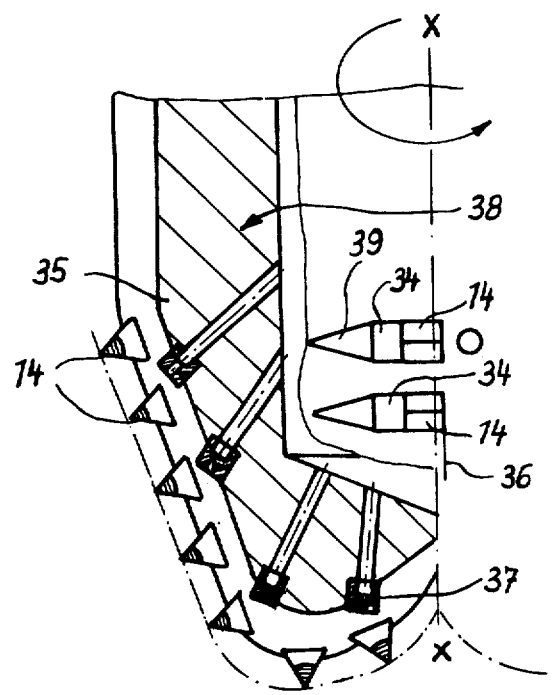
FIG. 19 shows a half axial section through a deep boring bit with cutting members secured to this in accordance with FIG. 18.
Figure 20:
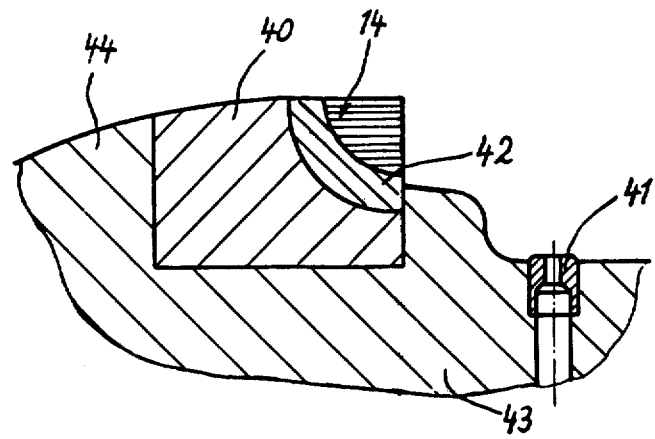
Figure 21:
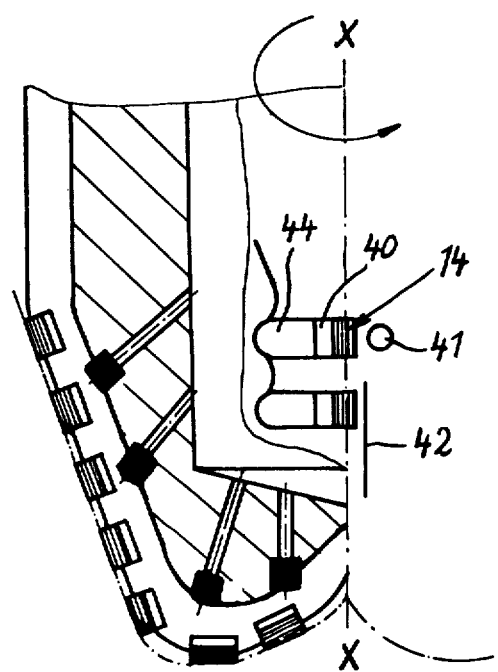
Figure 25A:
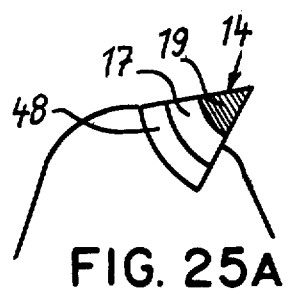
Figure 25B:
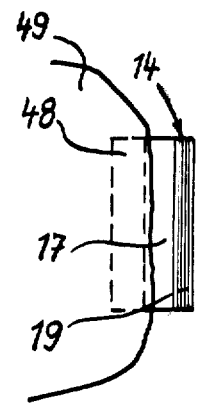
Figure 26:
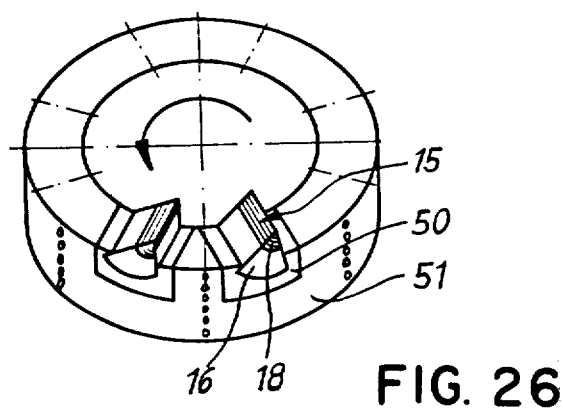

FIGS. 20 and 21 as well as 22 and 23 are illustrations corresponding to FIGS. 18 and 19 to illustrate modified forms of embodiment and arrangements of the cutting members;

FIG. 24 is a view of a deep boring bit with cutting members arranged in spiral form;

FIGS. 24a and 24b each show an enlarged illustration of the cutting members of FIG. 24 in views at right angles to one another;

FIGS. 25 to 25b are illustrations corresponding to FIGS. 24 to 24b to illustrate a modified arrangement of the cutting members; and FIG. 26 shows an example of an embodiment of a rotary boring bit constructed in the form of a core bit, illustrated in perspective.

Figure 1:
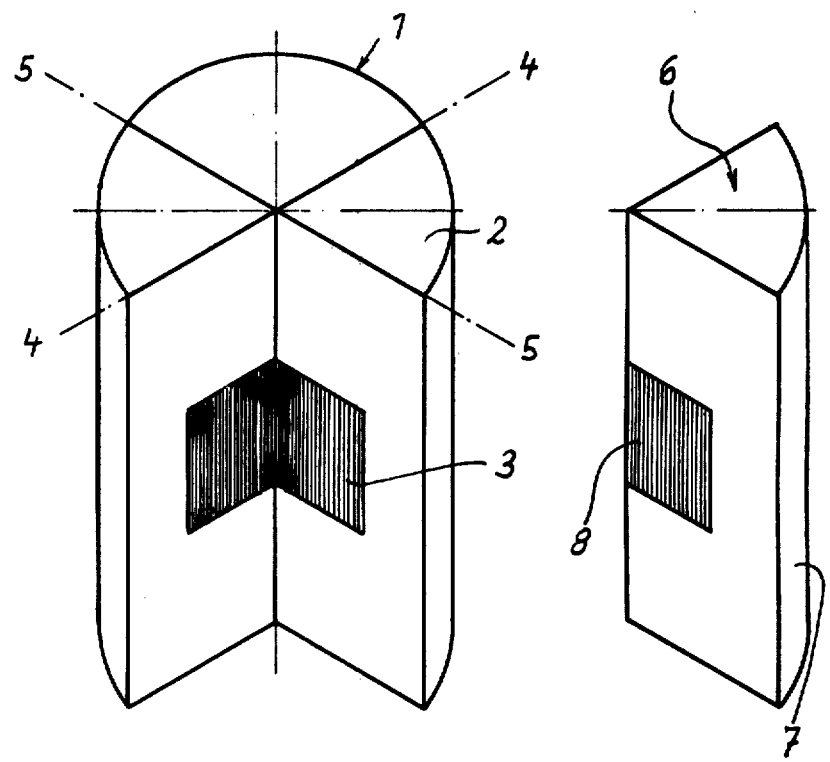
FIG. 1 shows, at the left-hand side a sintered body and at the right-hand side a segment from the sintered body forming a cutting member, illustrated in perspective.

In FIG. 1 of the drawings, a sintered body 1 in the form of a cylinder is illustrated which comprises a hard-metal shell 2, for example of tungsten carbide and a core 3 of polycrystalline diamond which is surrounded by the hard-metal shell 2 on all sides. By cutting the shaped body 1 along the lines 4 and 5, four cutting members are produced of which one, the cutting member 6, is illustrated in the right-hand half of FIG. 1. The cut-out region of the hard-metal shell 2 of the shaped body 1 forms a supporting portion 7 for a cutting portion 8 which is formed from the cut-out region of the core 3 of the shaped body 1 and which is surrounded by the supporting portion at the peripheral side and at the top and bottom or at both ends. The form of the cutting members 6 in the shape of quadrant-shaped segments is only selected by way of example in FIG. 1, and other suitable segment shapes may be selected instead, for example octantal-shaped.

Figure 2:
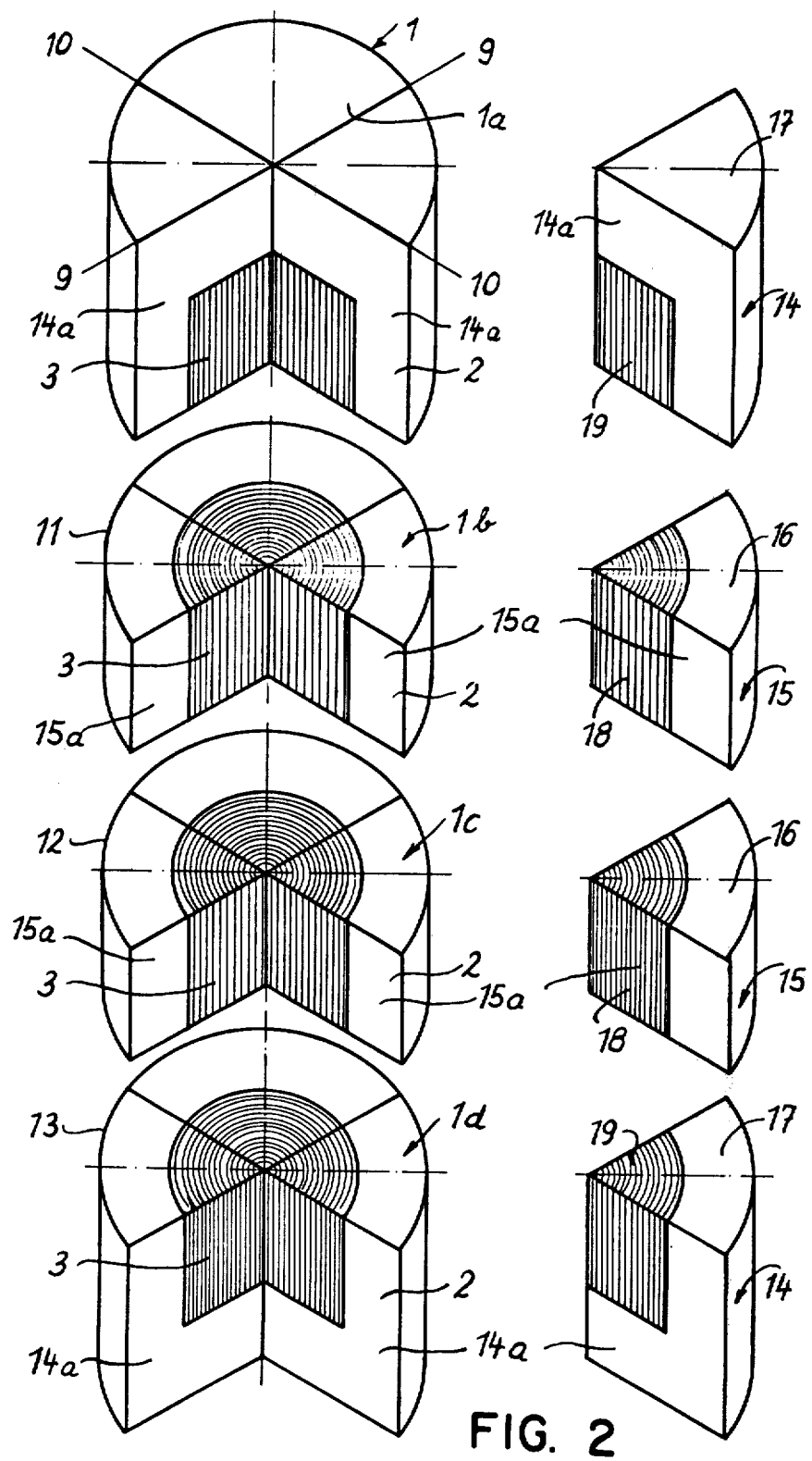
FIG. 2 shows, illustrated as in FIG. 1, a sintered body repeatedly divided with the resulting segments as cutting members.

In FIG. 2, in the left-hand half, the same shaped or sintered body 1 as in FIG. 1 is illustrated in principle but is divided by cutting lines 11, 12, 13 in radial planes into four shaped bodies 1a, 1b, 1c and 1d. All the shaped bodies 1a to 1d are divided as in the illustration in FIG. 1 along the cutting lines 9—9 and 10—10 extending in axial planes and at equal mutual angular distances apart. This again forms quadrant-shaped cutting members 14 and 15 as illustrated in the right-hand half of FIG. 2. The cut faces 14a and 15a of the cutting members 14 and 15 are made plane or straight and have the shape of regular sectors.

The sector-shaped cutting members 15 resulting from the shaped bodies 1b and 1c are alike in construction with the supporting portion 16 corresponding to the hard-metal shell 2 and the cutting portion 18 corresponding to the polycrystalline diamond core 3. In this case, the supporting portion 16 only surrounds the supporting portion 18 in the region of the peripheral arc of the cutting portion 18.

The cutting members 14 resulting from the shaped bodies 1a and 1d are in turn like one another in construction. The supporting portion 17 of the cutting members 14 surrounds the cutting portion 19 over the peripheral arcuate portion and additionally, in contrast to the cutting members 15, at one of the two opposite ends of the cutting portion 19 extending in a radial plane.

Figure 2A:
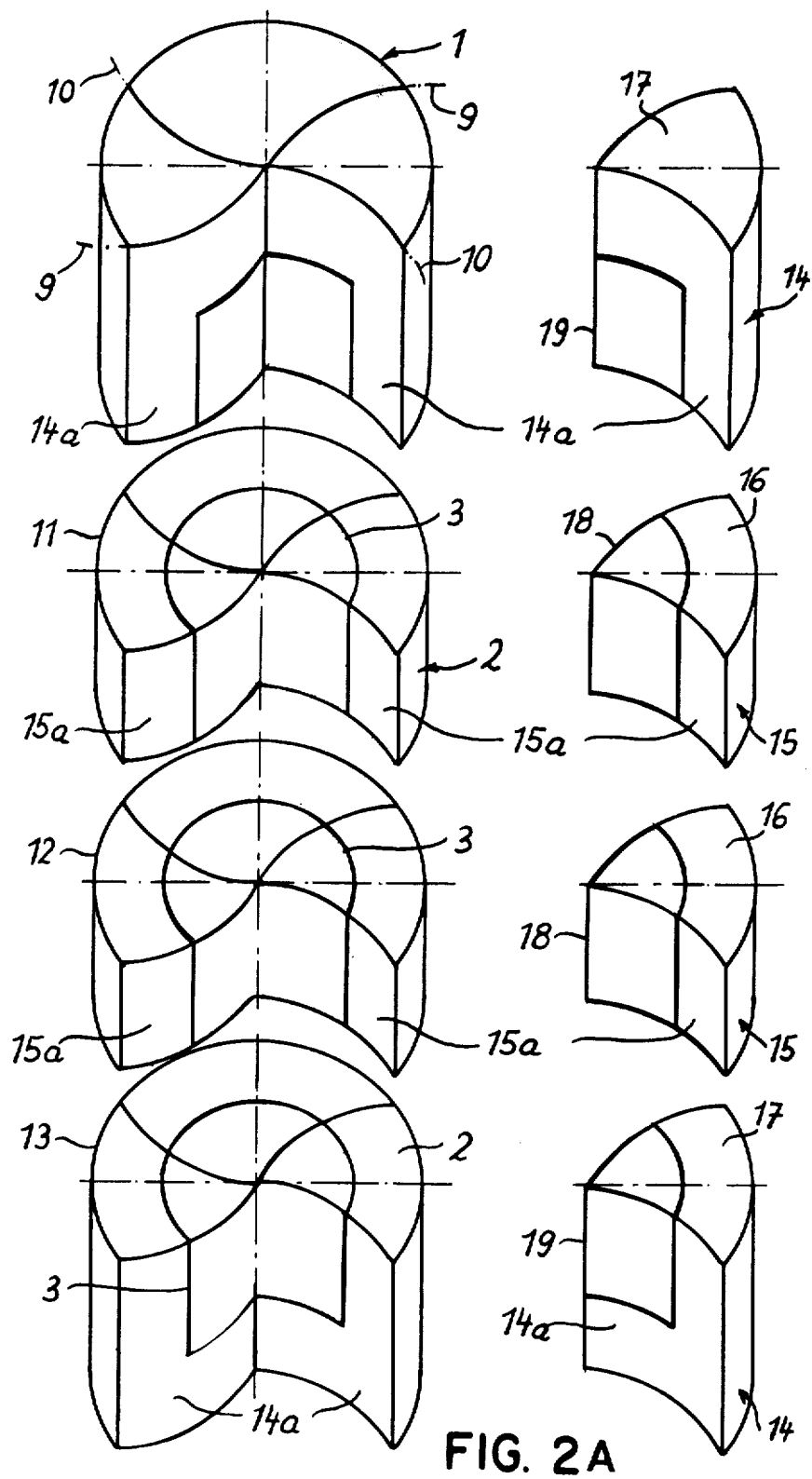
FIG. 2a shows an illustration corresponding to FIG. 2 with modified segments from the sintered body to form correspondingly modified cutting members.

The form of embodiment of the sintered body 1 and of the cutting members 14 and 15 of FIG. 2a corresponds substantially to the forms of embodiment of FIG. 2 and differs from these only in that the cutting lines 9—9 and 10—10 are made not rectilinear but arcuate. As a result, the cutting members 14 and 15 of FIG. 2a do not have the shape of a regular sector of the sintered body as in the case of example shown in FIGS. 1 and 2, but in the case of the example of FIG. 2a, cutting members 14 and 15 in the form of modified or irregular sectors of the sintered body 1 are formed, the cut faces 14a and 15a defined by the cutting lines 9—9 and 10—10 being correspondingly curved.

Both in the case of the examples of FIG. 2 and in those of FIG. 2a it is immaterial whether, in order to construct the cutting members 14 and 15, the sintered body 1 is first cut along the cutting lines 9—9 and 10—10 and then along the cutting lines 11, 12 and 13 or vice versa.

Figure 2B:
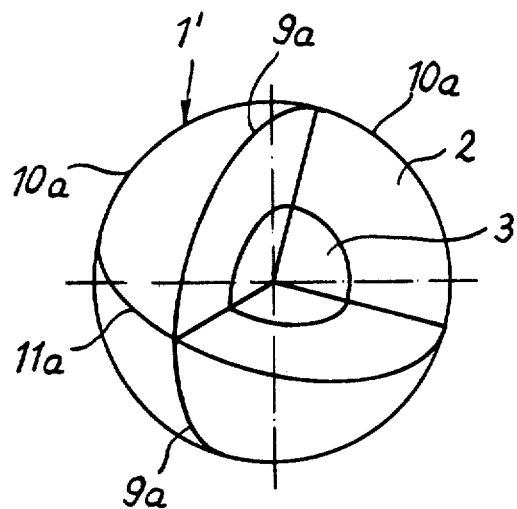
FIG. 2b shows a sintered body constructed in the basic shape of a sphere with a spherical segment from this sintered body forming a cutting member, illustrated in perspective.
Figure 2B:
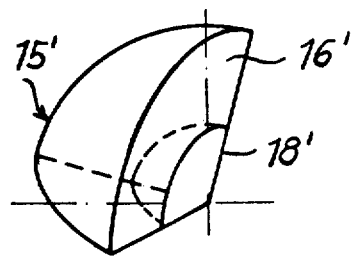

In the example of an embodiment in FIG. 2b, the sintered body 1' has the shape of a sphere. This sphere again comprises the hard-metal shell 2 and the core 3 of polycrystalline diamond material. The sphere 1' can be divided by a cutting line 11a into two hemispheres and from these cutting members 15' can be cut out along the lines 9a and 10a which intersect in the middle of the core 3 and are disposed at right angles to one another in the example illustrated. In FIG. 2b, the spherical sintered body 1' is provided with such an excision, from which the cutting members 15' result in the form of an eighth of a sphere of the shape illustrated separately in FIG. 2b at the bottom. This cutting member 15' again comprises a cutting portion 18' formed from polycrystalline diamond material and a supporting portion 16' of hard metal surrounding this as a jacket.

Just as the sintered body 1 may have the form of a polygonal straight prism instead of a cylinder, for example a parallelepiped, in which case the cutting lines 4—4 and 5—5 or 9—9 and 10—10 may appropriately be taken through axial outer edges of the prism, so the shaped body 1' may have the shape of a polyhedron instead of a sphere, a spheroid or the like body of revolution. The shape of such a polyhedron is optional but is preferably selected so that cuts passing through the core 3 are possible for the economical use of the sintered body for the purpose of forming substantially equal cutting members.

Figure 2C:
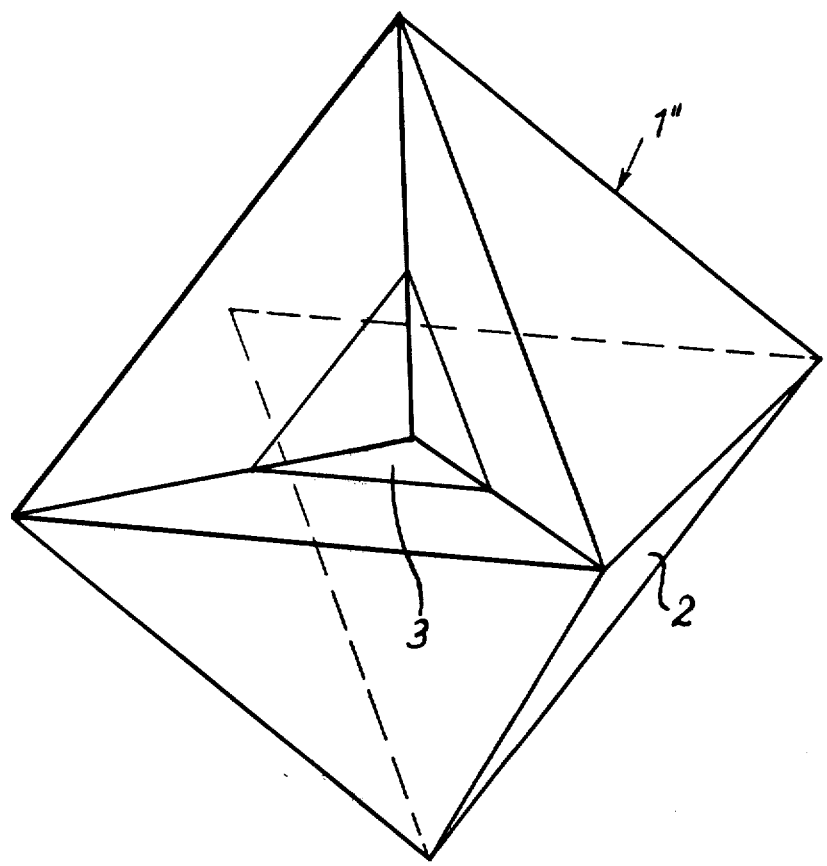
FIG. 2c shows a sintered body in the form of an octahedron and a segment from the octahedron forming a further example of an embodiment of a cutting member, illustrated in perspective.
Figure 2C:
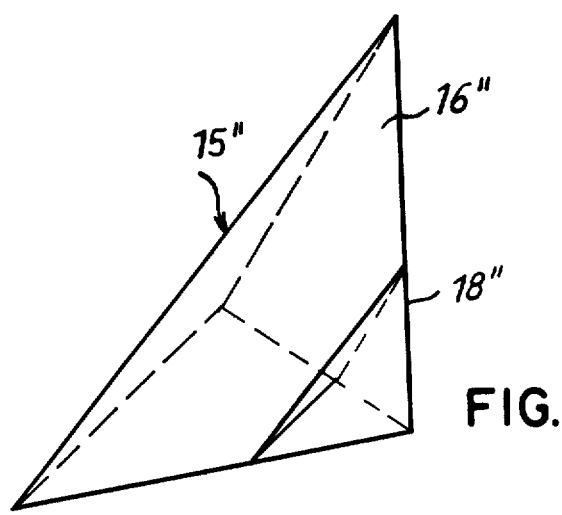

As an example of such a polyhedron, a sintered body 1" in the form of an octahedron with an excision forming an eighth of the octahedron is illustrated in FIG. 2c, the excision being illustrated separately in FIG. 2c at the bottom and forming the cutting member 15". This is again composed of the cutting portion 18" of polycrystalline diamond material corresponding to the core 3 and the supporting portion 16" corresponding to the hard-metal shell 2 of the sintered body 1".

Figure 2D:
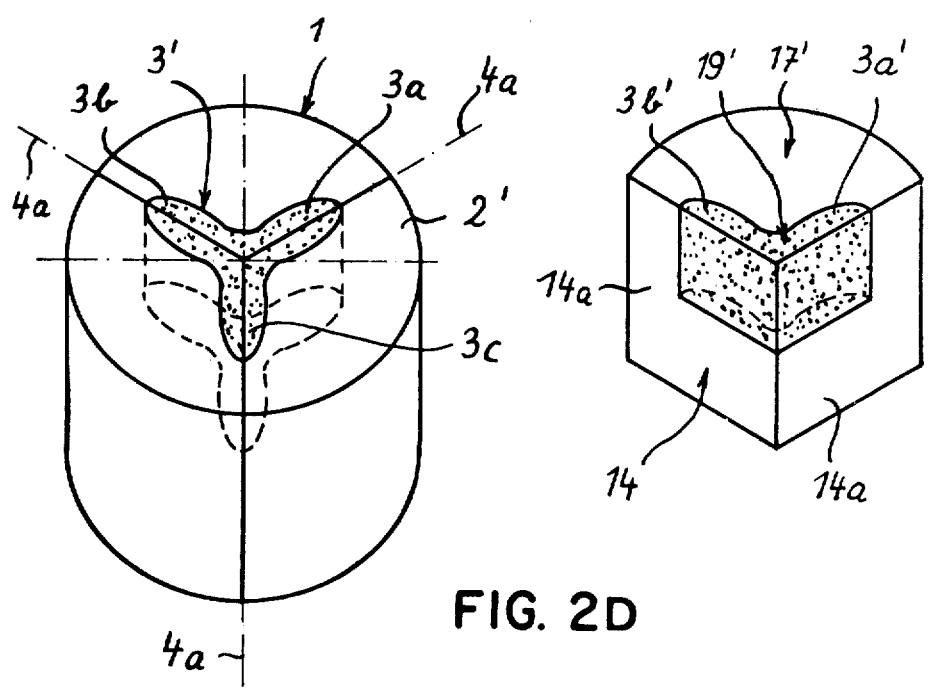
FIG. 2d shows, on the left-hand side a cylindrical sintered body with a star-shaped cutting portion and on the right-hand side a segment from the sintered body forming a further modified cutting member, illustrated in perspective.

The form of embodiment of the sintered body 1 shown in FIG. 2d has the basic shape of a cylinder as in the case of the examples according to FIGS. 1, 2 and 2a. In contrast to the said forms of embodiment, however, in the present example, the cutting portion 3' embedded coaxially or concentrically in the supporting portion 2' of the sintered body 1 has a star-shaped base shape in cross-section with three ray-like wings 3a, 3b, and 3c. In the sintered body 1, the cutting portion 3' is surrounded by the supporting portion 2' at the periphery and bottom. The wings 3a, 3b and 3c of the cutting portion 3' are rounded in the region of their ends and in the region of their transition at the base side.

Phantom lines 4a, which, in the example illustrated, are disposed at a mutual angular spacing of 120°, symbolize in the sintered body 1 in FIG. 2d the cutting lines or planes along which the sintered body 1 is severed to produce three cutting members in the example illustrated of the shape illustrated on the right-hand side in FIG. 2d. In this case, the cutting lines 4a extend in radial planes of the sintered body 1 centrally through the wings 3a, 3b, 3c of the star-shaped cutting portion 3'. The resulting cutting members correspond in their basic shape to those of the cutting members 14 and are therefore here likewise designated by the reference numeral 14. The cutting portion 19' has the modified shape with the two wing halves 3a' and 3b' of the original star-shaped cutting portion 3' of the sintered body 1 adjacent to one another at an angle. The supporting portion 17' surrounds the cutting portion 19' at the bottom and at the periphery with an arched portion engaging between the wing halves 3a' and 3b'.

Figure 2E:
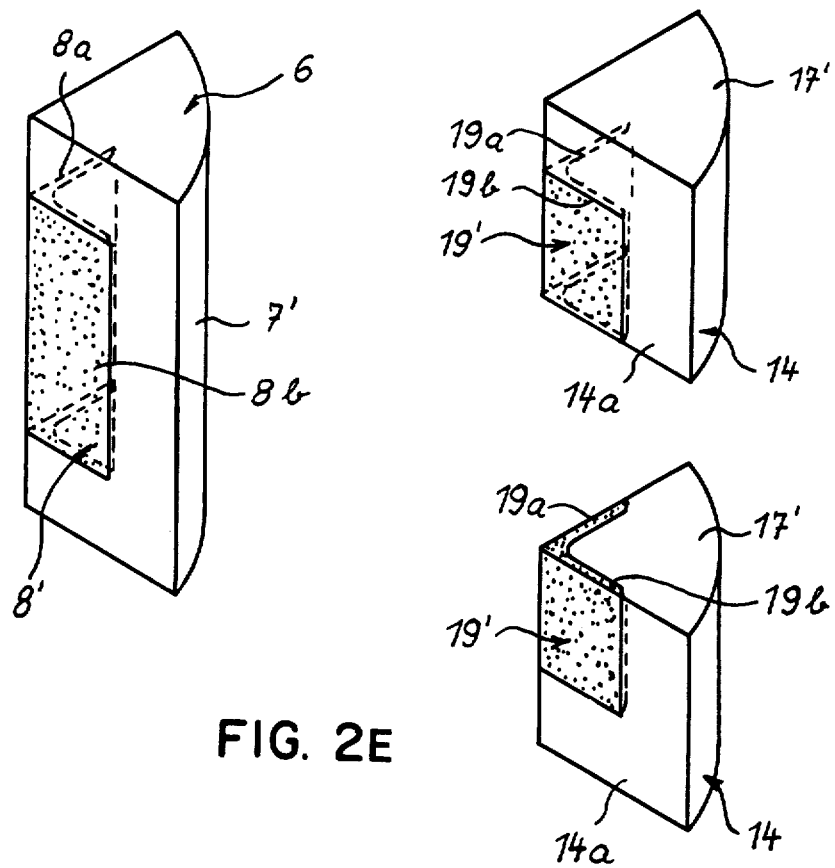
FIG. 2e shows modified forms of embodiment of cutting members, which are formed starting from a cylindrical sintered body with a star-shaped cutting portion.

The cutting member 6 illustrated at the left-hand side in FIG. 2e corresponds in its basic construction to the cutting member 6 in FIG. 1 and like this is formed from a segment from a cylindrical sintered body 1. The supporting portion 7' surrounds the cutting portion 8' at both ends and at the periphery. In a modification of the example shown in FIG. 1, however, the cutting member 6 is formed by quadrantal excisions from a sintered body, the cutting portion of which, as in the case of the example in FIG. 2d, has a star-shaped base shape in cross-section, but here comprises four ray-shaped wings which are again rounded in the region of their ends and in the region of their transition at the base side. The cutting lines for the production of the cutting members 6 according to FIG. 2e again extend centrally through the wings. In FIG. 2e, two wing halves of the cutting portion 8' of the cutting member 6 which adjoin one another at an angle are designated by 8a and 8b.

The cutting members illustrated on the right-hand side of FIG. 2e correspond in their basic construction to the cutting members 14 of FIGS. 2, 2a and 2b and are therefore again provided with the reference numeral 14, just as the same reference numerals are otherwise used for corresponding parts or regions. The wind halves of the cutting portion 19' which adjoin one another at right angles in the present example are designated by 19a and 19b.

In the production of the two cutting members 17' illustrated at the right-hand side of FIG. 2e, the procedure may be such that the cutting members 6 illustrated at the left-hand side of FIG. 2e is severed along a central transverse plane, or the cutting members 14 result from a sintered body 1 as shown in FIGS. 2 and 2a in accordance with the remarks made there.

Figure 2F:
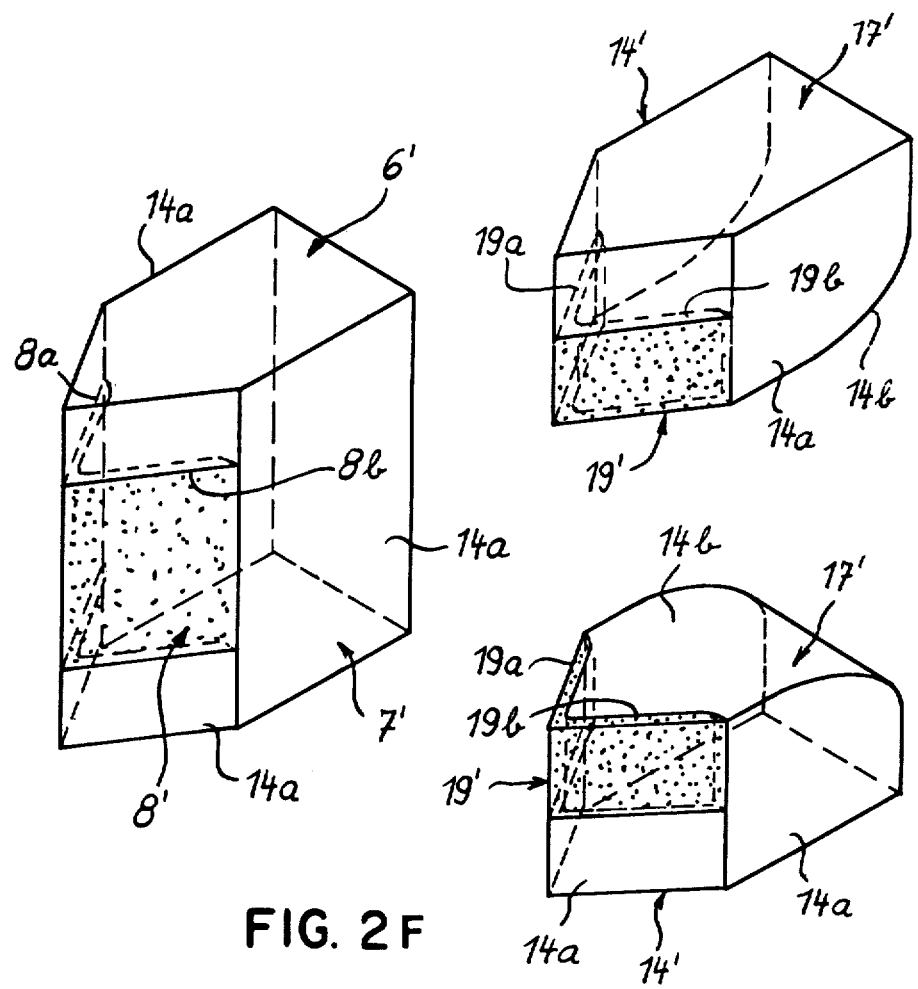
FIG. 2f shows further modified forms of embodiment of cutting members which are formed starting from a sintered body in the basic shape of a hexagonal prism again with a star-shaped cutting portion.

The same points of view with regard to the production apply also to the forms of embodiment of the cutting members 6' and 14' illustrated in FIG. 2f. The starting shape for these cutting members is a sintered body in the basic shape of a hexagonal prism with a cutting portion which accordingly comprises six ray-shaped wings. The same reference numerals as in FIG. 2e are used for the corresponding parts or regions of the cutting members 6' and 14' in FIG. 2f.

The cutting member 6' is formed from a sixth of the hexagonal sintered body forming the initial workpiece, and the cutting lines are taken through the outside vertical edges and the centre of the hexagonal prism. The resulting vertical, lateral cut faces 14a are machined away in their outer region, however, starting approximately from the outer ends of the wing halves 8a and 8b and 19a and 19b so that they extend parallel to one another. In addition, in the cutting members 14' illustrated in the right-hand half of FIG. 2f, the face 14b adjacent to the cutting portion 19' at the end is provided with a rounding towards the outside of the cutting member to produce a clearance face.

The cutting members illustrated in FIGS. 2d, 2e and 2f use less diamond or cubic boron nitride or the like superhardened materials for the cutting portion in comparison with the other forms of embodiment and are suitable, in particular, for working soft formations in arrangements on the rotary boring bit as explained in the following FIGS. 4, 14 and 15, and in the case of an arrangement in accordance with the last-mentioned figure, the cutting members develop a plough effect.

Figure 3:
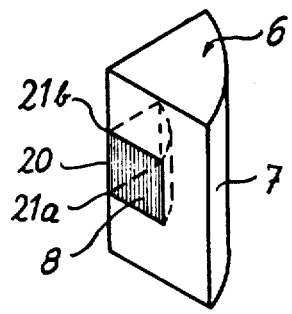
FIGS. 3 to 17 show examples of embodiments of cutting members, partially in working engagement with a formation.

The cutting members described and illustrated so far can be secured to the boring tool in the most varied arrangements, the rear region of the supporting member remote from the cutting portion always being used for this securing. As illustrated in FIG. 3 with reference to the cutting member 6, the cutting portion 8 offers a cutting edge 20 and cutting corners 21a and 21b.

Figure 4:
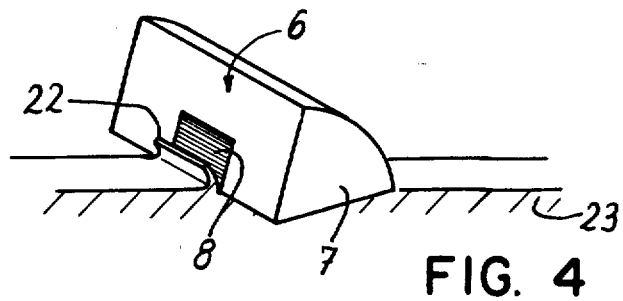
Figure 5:
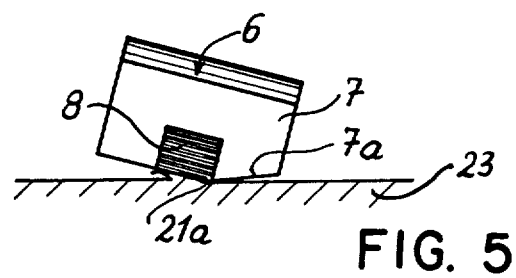
Figure 6:
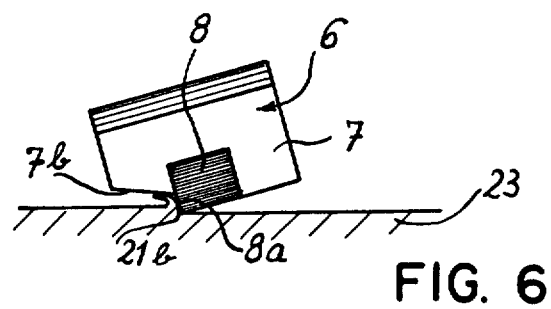

In FIGS. 4, 5 and 6, the cutting member 6 is illustrated in cutting engagement with a formation 23 to be bored. The cutting action of the cutting edge 20 can be seen from FIG. 4 which shows that the polycrystalline diamond material of the cutting portion 8, which is surrounded by the supporting portion 7 of hard metal, develops its cutting action along the line defined by the cutting edge 20 and forms the boring 22.

By an oblique arrangement and securing of the cutting members 6 in the tool, the cutting corners 21a or 21b can also be used for boring the formation 23, this being scraped or scratched by the particular cutting corner with the same feed direction. FIGS. 5 and 6 show such a mode of working. In the arrangement of FIG. 5, the cutting edge 21a has a scraping action and in the arrangement of FIG. 6 the cutting edge 21b has a scratching effect on the formation 23 and scratches this substantially in V-shape with corresponding chip formation. Furthermore, the supporting portion 7 can be cut away at 7a to provide a flank as FIG. 5 shows. With the reverse oblique position of the cutting member 6 shown in FIG. 6, the supporting portion 7 is cut away at 7b to provide or expose a V-shaped cutting face 8a of the cutting portion 8. As a whole, the supporting portion 7 has a supporting function for the cutting portion 8 and does not participate in the cutting operation, even in its regions engaging over the two ends of the cutting portion 8, as can be seen, in particular, from FIG. 4.

Figure 7:
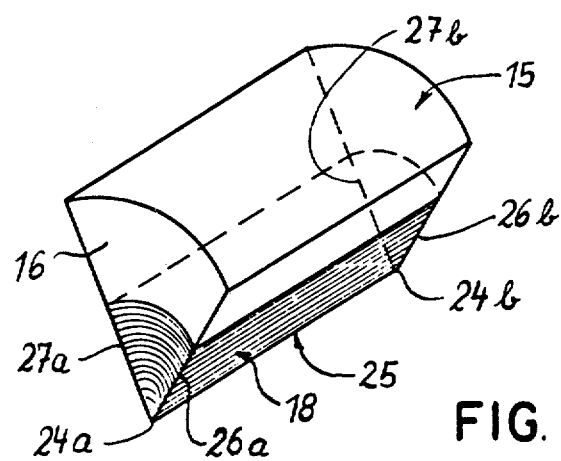

FIGS. 7 to 12 illustrate the possibilities of using the cutting member 15 which offers the cutting corners 24a and 24b, as well as the cutting edge 25, the cutting edges 26a and 26b and the cutting edges 27a and 27b (FIG. 7). The possible cutting relationships are illustrated in FIGS. 8 to 12.

Figure 8:
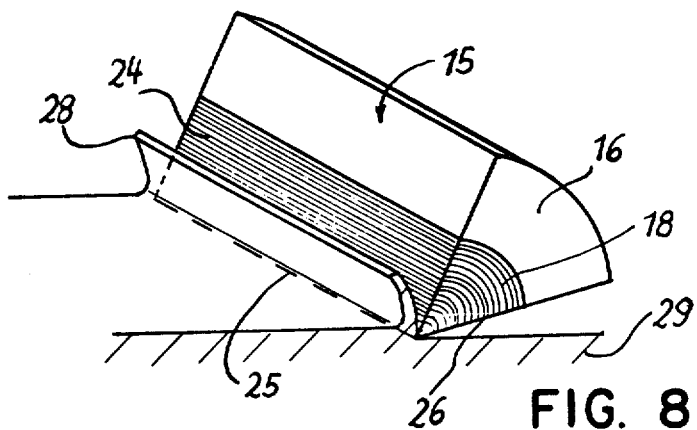
Figure 9:
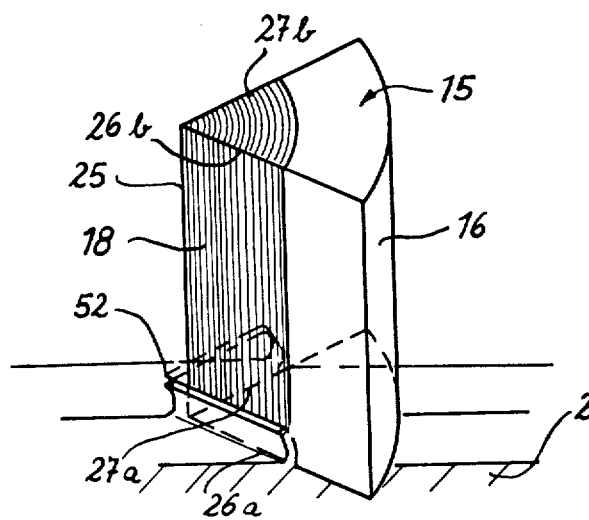
Figure 10:
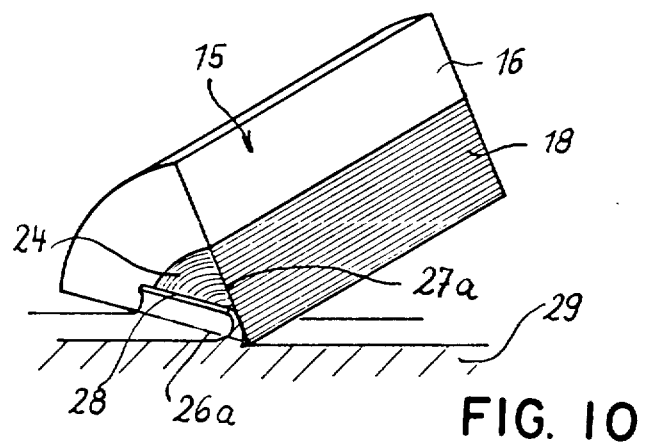
Figure 11:
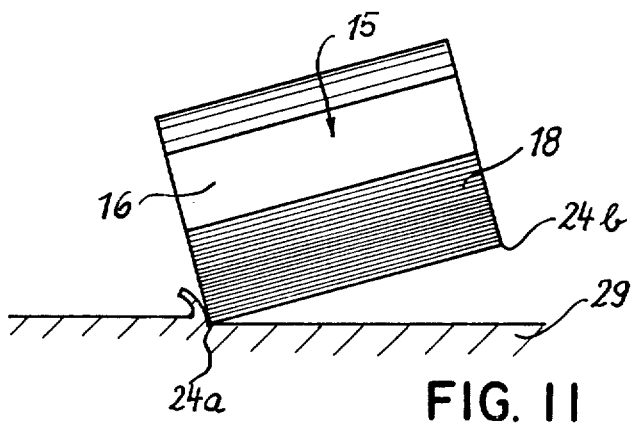
Figure 12:
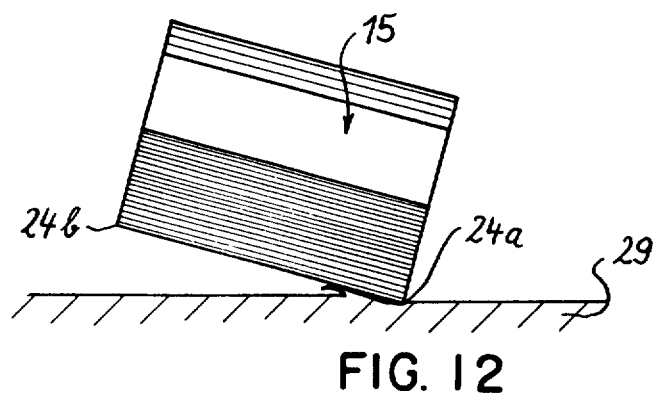

With an arrangement of the cutting member 15 in the boring tool as shown in FIG. 8, a chip 28 is parted off from the formation 29 by means of the cutting edge 25 in front of the cutting face 24 of the cutting portion 18, the flank of which is designated by 26. With an arrangement of the cutting member 15 as shown in FIG. 9, the cutting portion 18 acts like a plough, in that it cuts with the cutting edges 25, 26a and 27a. In an arrangement turned through 180°, the cutting member 15 cuts accordingly with the cutting edge 25 and with the cutting edges 26b and 27b. In both cases, a complex three-dimensional chip formation 52 results. In an arrangement as shown in FIG. 10, the cutting portion 18 of the cutting member 15 cuts with the cutting edge 26a. By appropriate modified oblique positions of the cutting member 15, the cutting edge 27a or 26a or 27b can be brought into engagement with the formation 29 instead of the cutting edge 26a. In this case, the cutting face 24 is in the form of a circular segment. In an arrangement as shown in FIG. 11, the cutting member 15 is suitable for scratching the formation 29 with a feed direction towards the left, and, in accordance with the example illustrated, the cutting corner 24a, or with a reverse oblique position the cutting corner 24b, is in engagement with the formation 29. With an inclined position as shown in FIG. 12, with the same feed direction, a scraping action is effected on the formation 29 by the tip or cutting corner 24a. It will be understood that with an appropriately reversed oblique position, a scraping action on the formation 29 can be effected with the cutting corner 24b.

The arrangements of the cutting member 6 or of the cutting member 15 described and illustrated above, with the associated modes of operation, also apply accordingly to the other cutting members described at the beginning, as is explained below for the cutting member 14 with reference to FIGS. 13 to 17.

Figure 13:
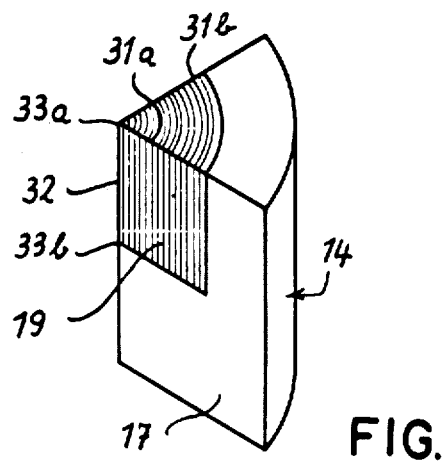

As FIG. 13 shows, the cutting portion 19 of the cutting member 14 comprises the cutting edges 31a, 31b and 32 as well as the cutting corners 33a and 33b. The geometrical relationships at the cutting portion 19 are illustrated in FIGS. 14 to 17 and correspond to the illustrations in FIGS. 8 to 12.

Figure 14:
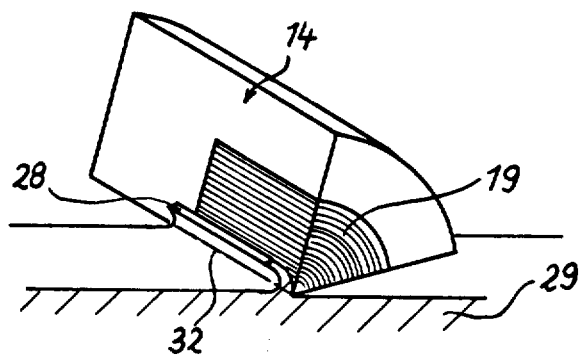
Figure 15:
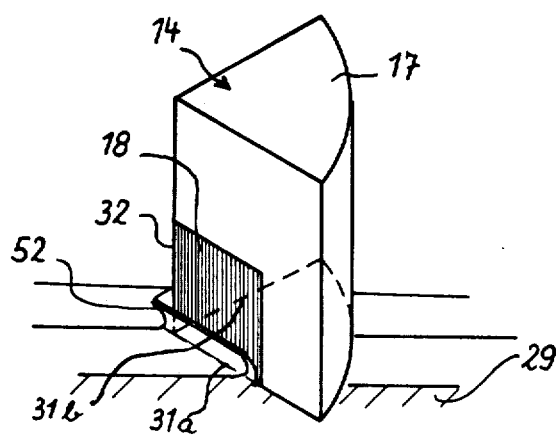
Figure 16:
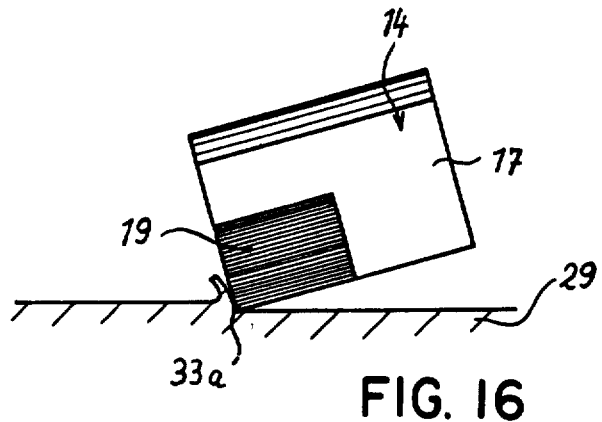
Figure 17:
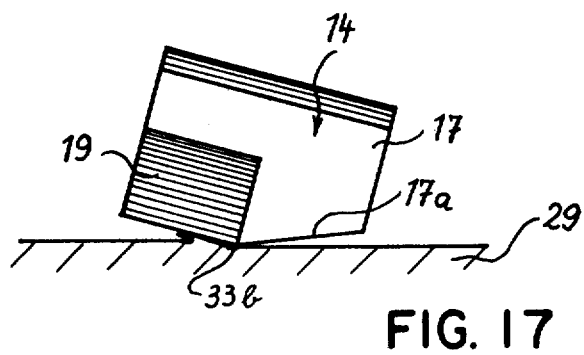

According to FIG. 14, the cutting edge 32 cuts forming a chip 28, while in the arrangement of FIG. 15, the cutting edges 31a, 31b and 32 cut forming the chip 52 and the cutting member 14 again has a plough effect. FIG. 16 illustrates the scratching of the formation 29 by means of the cutting corner 33a. FIG. 17 illustrates a scraping of the formation 29 by means of the cutting edge 33b, the supporting portion 17 again being cut away at 17a to provide a flank. The feed direction of the cutting member 14 is towards the left in both cases.

The constructions and arrangements described above of the cutting members are selected according to the intended use and depending on the boring conditions of the formation. Thus with hard rock formations, scratching or scraping operations are preferred for the boring operation. These can be achieved with arrangements according to FIGS. 5, 6, 11, 12 and 16, 17, and in addition to the cutting members shown in these figures, the cutting members 15' and 15'' can be used to particular advantage for such cutting operations. For very soft and plastic formations, the arrangements of the cutting members as illustrated in FIGS. 9 and 15 offer themselves, according to which a ploughing action of the cutting members takes place. In this case, the cutting members may also be arranged so that an asymmetrical plough effect results. For medium formations, which are not too abrasive, arrangements as shown in FIGS. 4, 8, 10 and 14 may be used, as a result of which the chip formation illustrated is achieved.

FIG. 18 illustrates, with reference to the cutting member 14, a possibility for securing the cutting members according to the invention to a deep boring bit. According to this, the cutting member 14 is connected by its supporting portion 17 to an appropriately shaped holding member 34, by adhesion or soldering. In the example illustrated, the holding member 34 is sintered into a matrix member 35 of the boring bit. A rib 36 of the matrix member 35 protects the soldering seam between the cutting member 14 and the holding member 34 from erosion as a result of the flushing liquid emerging from the usual flushing nozzles of the boring bit, one of which is illustrated at 37.

In the case of such a soldered connection of the cutting members to the boring bit, the cutting members may be provided with a surface coating of nickel, copper or cobalt, for example, which encourages a diffusion binding and which may be applied physically, chemically or galvanically. Such a surface coating encourages the flow of the solder in the soldering gaps between the contact faces of the supporting portion 17 and the holding member 34 and improves the production of satisfactory soldered connections.

In FIG. 19, a boring bit equipped with cutting members 14 in the manner explained with reference to FIG. 18 is illustrated diagrammatically in section. From this, the basic body 38 of the bit with the matrix mamber 35 and the cutting members 14 and the holding member 34 with the rib 36 situated in front of the cutting member 14 can be seen. The cutting movement results from rotation of the boring bit about the axis X—X.

A modified form of securing the cutting member 14 in the boring bit is illustrated in FIG. 20, wherein the cutting member 14 is inserted in accordance with the illustration in FIG. 6. In this case, the cutting member 14 is secured to a holding member 40 by soldering or adhesion. The soldered or adhesive joint is secured against erosion by the flushing stream emerging from the nozzle 41 by means of a rib 42. The holding member 40 is sintered into the basic body 43 of the bit in a furnace process. With this construction, as in the case of the construction according to FIG. 18, a rib 44 of the basic body of the bit is provided behind the holding member 40 and imparts the necessary rigidity with the wing or rib construction selected in the examples illustrated. In the sectional illustration according to FIG. 21 through a boring bit equipped with cutting members 14 in accordance with FIG. 20, holding member 40, cutting members 14 and nozzles 41 and the two ribs 42 and 44 can be seen.

Figure 22:
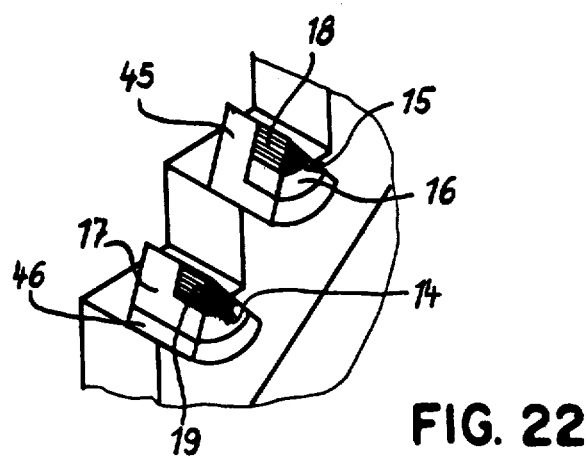
Figure 23:
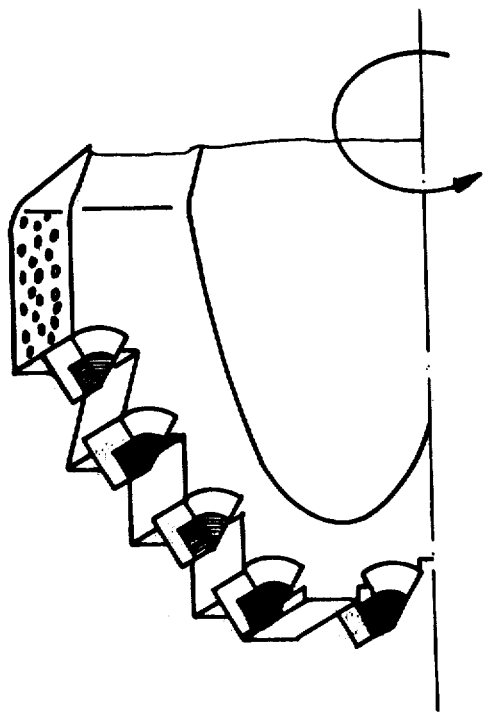

The cutting members 14 and/or 15 may also be disposed on a stepped tool as shown in FIGS. 22 and 23. The cutting conditions can be selected in principle in accordance with the arrangements illustrated in FIGS. 11 and 12 or 16 and 17. The cutting members 15 is soldered or stuck to a holding member 45 sintered into the basic body of the boring bit. The holding member 45 effects a rear supporting of the cutting member 15. If the cutting member 14 is used, the supporting of the cutting member by a holding member 46 at the side remote from the cutting face can be dispensed with because here the cutting portion 19 of the cutting member 14 is supported at the back by the supporting portion 17. FIG. 23 shows a stepped tool equipped with cutting members according to FIG. 2.

The construction of a deep boring bit with cutting members 14 and/or 15 set spirally, the cutting principle of which is selected in accordance with the illustrations in FIGS. 8 and 14, is illustrated in FIGS. 24, 24a and 24b, using cutting members 15. In this case, the cutting members 15 are disposed over the bit on a helical spiral or the like and are again secured to a supporting member 47 by soldering or adhesion.

In a modified form of embodiment according to FIGS. 25, 25a and 25b, the cutting members 14 and/or 15 are inserted in arrangements according to FIGS. 9 and 15, in which they develop a plough action. When the cutting members 14 are inserted as illustrated in FIGS. 25 to 25b, the arrangement may be such that only the cutting portion 19 projects from the matrix member of the bit. The corresponding support of the cutting member 14 is effected through a holding member 48 and a rib or support 49 forming part of the matrix member. The same applies accordingly to the embodiment of FIG. 24.

The use of the cutting members described and illustrated in a rotary boring bit constructed in the form of a core bit is illustrated in FIG. 26, using cutting members 15. In this case, the cutting members 15 are soldered or stuck to a holding member 50 being distributed with equal spacing over an annular end face. The holding member 50 is rigidly connected to a matrix shaped member 51 of the core bit by infiltration in the example illustrated.

The material of the cutting members is adapted to the basic body 35 of the bit in such a manner that the supporting portion 7, 16 or 17 of the cutting members has a lower wear resistance in comparison with its cutting portion 8, 18 or 19 and a higher wear resistance in comparison with the base member 35. If the cutting members are each secured to the base member 35 by means of a holding member, as illustrated in FIGS. 18 to 25 with reference to the holding members 34, 40, 45 and 46, then with such a construction, it is provided that the particular holding member has a lower wear resistance in comparison with the supporting portion 7, 16 or 17 of the cutting member and a higher wear resistance in comparison with the basic member 35. As a result of this construction, the effect is achieved that a wear form develops in the region of the particular cutting member on the bit in such a manner that the least wear occurs at the cutting portion 8, 18, 19 and the wear gradually increases towards the base member 35. This ensures that even in the case of a severe wear pattern of the cutting portion 8, 18 or 19, the cutting member is always freely exposed and can perform its cutting work.

In this connection, it is further advisable to select the material rigidity of the supporting portion 7, 16 or 17 of the cutting members greater than that of the basic member 35 and less than that of its cutting portion 8, 18 or 19. If the cutting members are each secured to the basic body 35 by means of a holding member 34, 40, 45 or 46, as stated above, then the holding member preferably has a lower material rigidity in comparison with the supporting portion 7, 16 or 17 and a higher material rigidity in comparison with the basic body 35. As a result of such a graduated decrease in the rigidity from the cutting portion of the cutting members towards the base member 35 of the bit, a satisfactory drawing off of the forces occurring during boring operation from the cutting members and their taking up in the base member of the bit is achieved.

In order to achieve these material characteristics, tungsten carbide, for example, bonded in alloys on a copper base, for example brass or bronze alloys, as well as those with various proportions of nickel, cobalt, tin, zinc, manganese, iron and silver may be used for the basic body of the bit. Tungsten carbide comes into consideration primarily for the supporting portion 7, 16 or 17 of the cutting members. An appropriately modified composition can be used for the holding members 34, 40, 45 or 46. The latter may also be provided with a coating, for example in the form of nickel, copper or cobalt, which encourages a diffusion binding, in order to improve in this manner the strength of a soldered connection between the holding member and the basic body 35 of the bit on the one hand and the supporting portion 7, 16 or 17 of the cutting members on the other hand.

In the production of the sintered body forming the particular starting workpiece for the cutting members, the supporting portion may be prefabricated in the form of an at least partially pre-shaped sintered shaped body, for example in the form of a cylinder closed at the bottom, after which the cavity in this pre-shaped body is filled with a mass of diamond particles and cobalt powder for example, which is then sintered in. During or after the sintering of the mass forming the cutting portion in the finished product, the pre-shaped body can be completed. It is also possible to produce the cutting portion in the form of a separate, sintered pre-shaped body and either to insert it in a pre-shaped body forming the supporting portion and then to unite it with the sintered body completing the supporting portion, using compound substances such as zirconium, cobalt and nickel, or to sinter it into the supporting portion during the sintering of this.

The cutting members employed in this invention can be made by the method shown in U.S. Pat. Nos. 3,745,623; 4,063,909; and 3,743,489, wherein diamond or cubic boron nitride powders are compacted, along with a supporting hard carbide material, under pressures and temperatures in the diamond stable region of the pressure temperature diagram.

We claim:

1. A rotary boring bit for boreholes, comprising a body which is provided on its outer periphery with cutting members each of which consist of a supporting portion and a cutting portion disposed on the supporting portion, each cutting member being formed as a wedge shaped cut-out segment of a sintered body with a supporting portion surrounding the cutting portion as a casing at least at the periphery, said cutting portion being a material selected from compacted diamond and compacted cubic boron nitride.

2. A rotary boring bit as claimed in claim 1, in which the cutting member is a section of a sintered body having a supporting portion surrounding the cutting portion on all sides as a jacket.

3. A rotary boring bit as claimed in claim 1 or claim 2, in which the sintered body has the form of a cylinder for the formation of the cutting members.

4. A rotary boring bit as claimed in claim 1 or claim 2, in which the sintered body has the form of a polygonal straight prism for the formation of the cutting members.

5. A rotary boring bit as claimed in claim 2, in which the sintered body has the form of a sphere for the formation of the cutting member.

6. A rotary boring bit as claimed in claim 2, in which the sintered body has the form of a polyhedron for the formation of the cutting members.

7. A rotary boring bit as claimed in claim 1, in which the cutting portion is embedded coaxially or concentrically in the supporting part of the sintered body.

8. A rotary boring bit as in claim 7, in which the cutting portion has a star-shaped base shape with at least three ray-like wings in cross-section.

9. A rotary boring bit as claimed in claim 8, in which the wings are rounded in the region of their ends and in the region of their transition at the base side.

10. A rotary boring bit as claimed in claim 1, in which the supporting portion of the cutting members has less wear resistance in comparison with its cutting portion and more wear resistance in comparison with the basic body.

11. A rotary boring bit as claimed in claim 10, in which the cutting members are each secured to the basic body by means of a holding member, and in which the holding member has less wear resistance in comparison with the supporting portion of the cutting member and higher wear resistance in comparison with the basic body.

12. A rotary boring bit as claimed in claim 11, in which the holding member is provided with a coating encouraging a diffusion binding to the basic body.

* * * * *